June 4, 1929.        W. C. MORRILL        1,715,774
DISPENSING VALVE
Filed March 12, 1927
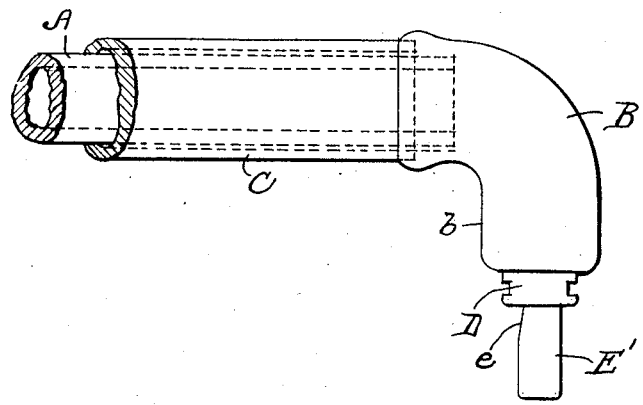
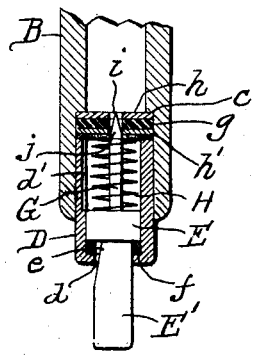
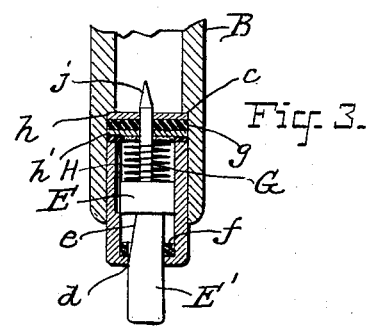
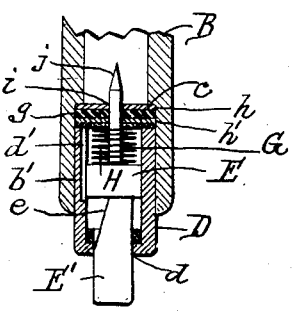
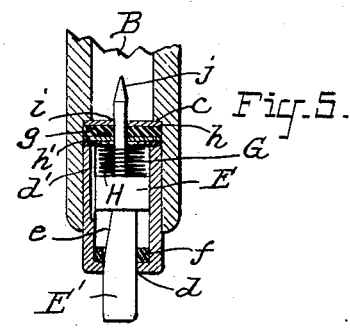
INVENTOR.
William C. Morrill
BY
ATTORNEY Patented June 4, 1929.

1,715,774

UNITED STATES PATENT OFFICE.

WILLIAM C. MORRILL, OF NEW YORK, N. Y.

DISPENSING VALVE.

Application filed March 12, 1927. Serial No. 174,861.

My invention pertains to means whereby a liquid material under very considerable or relatively high pressure may be dispensed under reduced pressure at any one of a number of service valves without waste of the liquid material itself and without injury to the parts of the individual service valves.

More particularly, the invention is a dispensing valve for the delivery of a regulated or determined quantity of liquid material at each of repeated service operations, such valve constituting one unit of a relatively large number of such units in a system of liquid distribution, wherein the liquid material is stored or contained under conditions which results in the application of a very considerable pressure internally of the individual dispensing valves.

The object of the invention is to dispense liquid material under reduced pressure in restricted and determined quantities from a source of supply wherein the liquid is stored under a very considerable pressure or head such as arises when a system of distributing pipes installed on several floors (two or more) of a building are connected with an elevated service tank located for feeding liquid material by gravity to such distributing pipes on the several (two or more) floors below the tank.

The invention is embodied in means acting to relieve from liquid pressure the working parts of a dispensing valve at the period of the service operation of such valve, to the end that the required determined quantity of liquid material may be delivered. Such pressure relieving means may be, and preferably are, unitary with the dispensing valve, and, again, such relief means may be embodied in any one of several operative forms. In a practical embodiment of the invention, I employ, preferably although not essentially, a dispensing valve of the character disclosed in prior Patent No. 911,-834, reissued April 6, 1915, Reissue No. 13,-898, and with such dispensing valve there is combined and associated a pressure cut-off adapted to be set into action on the service operation of the dispensing valve, whereby the liquid material under pressure is throttled, and its flow cut off from the service line to the dispensing valve, as a result of which the dispensing valve may be operated manually with facility notwithstanding its action is opposed at the initial stage by the relatively high pressure of the liquid material.

Other functions and advantages of the invention will appear from the following description taken in connection with the drawings, wherein—

Figure 1 is an elevation of one form of a dispensing valve to which liquid material is adapted to be supplied at quite considerable pressure from a service line of piping supplied in common with other service lines from an elevated tank.

Figure 2 is a vertical section on an enlarged scale of the valve mechanism, with the piston valve and the delivery valve in normal positions and with the throttle valve opened for the admission freely to the feed chamber of the liquid under pressure.

Figures 3, 4 and 5 illustrate the valve mechanism in several positions which the parts assume in the course of a single service operation for dispensing a regulated quality of liquid from a service line, wherein the fluid is under considerable head or pressure.

In the embodiment shown, the pipe A of a service line is provided with an elbow, B, one member, $b$, of which is in a pendent relation to the service pipe. As shown, the service pipe is encased by a sleeve, C, to impart a desirable finished appearance to the fixture. The sleeve and the service pipe are attached or connected as desired to the horizontal member of the elbow B. The pendent member, $b$, of said elbow is provided for a part of its length with a female thread, $b'$, and with an internal shoulder, $c$, and into this threaded part, $b'$, of said elbow is screwed a shell, D, of the dispensing valve mechanism. Said valve shell is encased partly by the elbow, B, but it is preferred to have the lower part of said shell D protrude below the pendent member, $b$, of said valve shell, although such arrangement is optional.

As in my prior patent, the valve shell is provided with a delivery port, $d$, and with a by-pass passage, $d'$, and within said shell is arranged a piston valve, E, the stem, $E'$, of which passes through said port, $d$, and which stem is provided with a bevel or chamfer, $e$, affording in certain positions of the stem a passage by which the liquid, in a determined quantity, may be ejected forcibly by the action of the piston valve, E. It is preferable to use a seat, $f$, for a knife edged rib, f', on the under surface of the piston valve, said seat being composed usually of a more or less pliable material, such as a washer of leather, rubber, cork, or other substance appropriate for the purpose.

With the dispensing valve shown, there is associated a throttle valve for the purpose, primarily, of relieving the dispensing valve from the pressure of the liquid material at several stages in the service of said dispensing valve for the delivery of a determined quantity of the liquid material. As stated heretofore, the throttle may be embodied in different constructional forms, but as a practical example of the invention, I have elected to illustrate herein a needle valve acting conjointly with the piston valve, said needle valve functioning as a means for throttling the flow into the valve shell of liquid under pressure from the service line.

One member of the throttle valve is a head, partition or division wall, preferably of a composite character, interposed between the valve shell D, and the chamber of the liquid service line, and affording a port for the inflow of the liquid and a seat for the throttle valve. Said head, partition or division wall in conjunction with the throttle valve affords, in the at rest position of the piston valve E, a more or less free path for the flow of liquid material from the service line to the chamber of the valve shell D above said piston valve E, thus feeding liquid material to the dispensing valve mechanism. The head, partition or division wall is retained fixedly with respect to the service line and to the dispensing valve, and as shown, this head, partition or division wall is seated against the shoulder, c, and is in effect clamped firmly between the shoulder, c, and the end face of valve shell D. The head, partition or division wall is composed of a plurality of superposed pieces of appropriate material, and for this purpose it is desirable to use a piece, g, of soft material such as rubber or leather, and a plurality of metallic members or washers, h, h', the soft material being between the metallic members and protected thereby. The composite head is thus simply constructed and is positively held in position, the soft material of the member g affording the desired frictional engagement with the needle valve. The layers g, h, h', composing the head, partition or division wall, are pierced centrally to constitute a liquid port, i, and in this port is adapted to travel the stem, G, which functions as the throttle valve or the needle valve, heretofore mentioned. The stem is shown as a metallic rod unitary with the piston valve E, extending upwardly therefrom, and pointed at the upper free end, it being desirable to impart a tapering or conical formation, j, to the free upper extremity of said needle valve. Obviously, the needle valve may be integral with the piston valve, or it may be made separately and attached fixedly to the piston valve, centrally thereof. The valves E, G, are so dimensioned and proportioned that with the piston valve E in an at rest position at the bottom of the valve chamber and seated upon the washer f, the conical extremity, j, of the throttle valve occupies the port, i, in the head or division wall, thus in a measure throttling the free flow of the liquid material under pressure from the service line into the dispensing valve. The parts are of such dimensions, however, that an adequate supply of the liquid material exists within the chamber of the valve mechanism above the piston valve, E, so that on the upward movement of the parts, E, E', G, the dispensing mechanism functions as follows:—Needle valve G slides in port i and cuts off the inflow of liquid material to the valve chamber, piston valve E travels above the lower end of the by-pass d' and liquid in the chamber passes through the by-pass to the space below the piston valve, and stem E' moves in port d for the bevel or chamfer e to pass above the port and thus the stem E' closes said port against the outflow of liquid material admitted to the space below the piston valve. It is thus apparent that on the upstroke of the valves E, E', G, the throttle cuts off communication between the service line and the dispensing valve chamber and a determined quantity of liquid material passes from the space above valve E to the space below said valve, such determined quantity of material being retained momentarily within the space below the piston valve. The downstroke of the valves E, E', G, functions as follows:—the piston valve passes below the by-pass, d', and cuts off the flow to the space below said valve; the stem E' opens the port d by way of the chamfer e, so that on the downstroke the piston valve E acts upon the liquid to forcibly eject the same and splatter the limited quantity of liquid upon the palm of the hand, and the throttle valve G is partly withdrawn from the port i in order that the liquid material under pressure may flow from the service line to the valve chamber. It is apparent that the actions of the parts take place quickly and in a determined sequence for the performance of the functions stated, but in this connection it is desirable to employ a spring, H, for returning the several valves to their normal positions, wherein the piston valve cuts off the outflow of liquid material, the ports, d, i, being open or partly open.

The operation may be described as follows:—With the parts in the position of Figure 2, the piston valve is seated on washer f for cutting off the outflow of the liquid material, the conical end of needle valve G occupies the port i for throttling the free flow of liquid under pressure into the valve chamber from the service line, and the chamfer *e* of stem E′ opens the delivery port *d*. The hand, with the palm upward, is placed below the stem E′, and a quick up thrust is made, the hand being thereafter lowered. On this upstroke, the following actions take place:—Valves E, E′, G, slide upward at one and the same time; valve E moves to the positions of Figures 3 and 4 successively to open the by-pass *d*′, but it is to be noted that by the time valve E reaches the position of Figure 3 where the lower edge of said valve is flush with the lower end of the by-pass, the throttle valve G slides within the port *i* and has a wiping frictional contact with washer *g*, as a result of which valve G acts to cut off the flow of liquid through port *i* at the time when valve E opens the by-pass *d*′, whereby the liquid from the service line is effectually restrained from acting by its pressure to force its way around the piston valve to the delivery port *d*; and thus the liquid present in the valve chamber is free to pass through the by-pass *d*′ into the space below said piston valve, and the port *d* is closed by the solid part of stem E′ filling the opening constituting the port, thus cutting off the outflow of the liquid through said port *d*. The upstroke having taken place, the valves are lowered, assisted by or impelled by the recoil of spring H, whereupon the following actions occur:—
Piston valve E displaces the liquid from the space below said valve, the port *d* is opened by the downstroke of valve stem E′, the chamber *e* of which admits the delivery of the liquid, such liquid being forcibly ejected by the action of piston valve E so as to splatter the liquid upon the palm of the hand, and needle valve G is withdrawn partly from the port *i*, although said valve G in effect keeps the port *i* closed at the period when the parts E, E′, are forcibly expelling the determined quantity of such liquid through delivery port *d*.

The head or partition (composed of the parts *g*, *h*, *h*′), is positioned between the valve chamber and the liquid under pressure within the service line, said head being exposed to such liquid pressure and taking up, in a large measure, such pressure and relieving to a very considerable extent, the piston valve from the effect of such pressure, so that my new triple valve is capable of operation with comparatively little effort. The port *i* in the head or partition is small in area relatively to the cross section of the valve chamber and the service line, and this port, with the throttle valve occupying the at rest position, is more or less obstructed by the conical extremity of the throttle valve, with the result that the liquid under pressure is throttled in its flow from the service line to the valve chamber.

The parts E, E′, G, act conjointly and function as a triple valve in dispensing the liquid, to the end that the pressure is checked or reduced and the quantity is restricted to the desired limit when said triple valve is actuated to perform the service of delivering a small quantity of liquid. Such triple valve acts, chiefly, to overcome within the dispensing valve chamber the effect of the pressure existing in the service line, to the end that in feeding the required limited quantity as determined on the stroke of the piston valve the pressure cannot force the liquid in a stream past said piston valve, and through the by-pass. This is apparent by noting the action of the needle valve relatively to the piston valve. On the upstroke of the triple valve, the needle valve slides within the port *i* for closing the latter concurrently with the movement of the piston valve to open the by-pass to the space below said piston valve; in fact, port *i* is in effect closed prior to the opening of the by-pass, thus shutting off the flow from the service line to the valve chamber. At this stage in the cycle of operations, the liquid present in the valve chamber flows through the by-pass into the space below the piston valve, with the result that, on the downstroke of the triple valve the liquid is forcibly ejected by piston valve E acting as a piston upon the liquid admitted to the space below said piston valve.

It is noted that liquid under pressure is admitted to the valve chamber by way of a port of restricted area, and that in the at rest position of the needle valve the area of such feed port open to the flow of liquid material is further restricted by the conical upper extremity of the needle valve. The by-pass affords a path for the outflow of the liquid from the space above the piston valve to the space below said valve, but this by-pass is not opened until subsequent to the operation of closing the feed port. Accordingly, the needle valve functions to close the feed port to the valve chamber prior to the action of the piston valve to open the by-pass, and thus the pressure of the liquid material cannot force such material around the piston valve and into the space below said valve, thus precluding waste of the liquid material.

Having thus fully described the invention, what I claim as new and desire to secure by Letters Patent is:

1. A liquid dispensing device embodying a valve chamber the wall of which is provided with a channel constituting a liquid by-pass, a head at one end of said valve chamber and provided with an inlet, a piston valve slidable in the valve chamber and traversing said channel, said valve being operable in one direction for displacing through said channel liquid present between the valve and said head and said valve operating in its movement in the other direction for mechanically and forcibly ejecting liquid flowing in a determined quantity through said channel to the valve chamber below said piston valve, an outlet, a valve member for operating said piston valve and controlling said outlet, and a throttle valve movable with the piston valve and operable in said liquid inlet of said head for shutting off the flow of liquid to the valve chamber at the initial movement of the piston valve.

2. A liquid dispensing device embodying a valve chamber provided in a wall thereof with a channel constituting a liquid by-pass, a head at one end of said valve chamber, said head having a liquid inlet, a piston valve positioned within said valve chamber for traversing said channel, said piston valve being movable in one direction for expelling through said channel a definite quantity of liquid present in the valve chamber between said piston valve and said head and said piston valve operating on the movement in the opposite direction for mechanically and forcibly expelling the definite quantity of liquid flowing through said channel, a throttle valve stem unitary with said piston valve and slidable in said liquid inlet for arresting the flow of liquid to the valve chamber at the initial movement of said piston valve, a liquid outlet, and a shut-off stem unitary with the piston valve and operable for arresting the outflow of the determined quantity of liquid during the initial movement of said piston valve.

3. A liquid dispensing device embodying a valve shell composed of a plurality of members one of which is provided with a channel constituting a liquid by-pass, a head positioned in the valve shell and held fixedly therein by cooperation of the valve shell members, said head having a liquid inlet, a piston valve slidable within the valve chamber and relatively to the channel, said piston valve being operable in its movement in one direction to forcibly expel through said channel a definite quantity of liquid present in the valve chamber between the head and the piston valve and said piston valve operating on the movement in the other direction for mechanically and forcibly ejecting said definite quantity of liquid from the dispensing device, a liquid outlet, a stem unitary with the piston valve and slidable in said liquid outlet, and a throttle valve stem unitary with said piston valve and slidable in the liquid inlet of said head for shutting off the inflow of liquid to the valve chamber during the periods of the movement of said piston valve within said valve chamber.

4. A liquid dispensing device embodying a valve chamber provided in a wall thereof with a channel constituting a liquid by-pass, a multi-disk head confined fixedly within said valve chamber and provided with a liquid inlet, said multi-disk head including a plurality of rigid members and another member composed of soft material between said rigid members, a piston valve slidable within the valve chamber relatively to the channel, said piston valve operating in its movement in one direction to displace through said channel a definite quantity of liquid present in the valve chamber between said head and the piston valve and said piston valve operating on its movement in the opposite direction to mechanically and forcibly expel the definite quantity of liquid through an outlet, a throttle-valve stem unitary with the piston valve and slidable in the liquid inlet for frictional engagement with the soft material of one member of said multi-disk head, a liquid outlet, and a valve-stem unitary with the piston valve and slidable through said liquid outlet.

5. A liquid dispensing device embodying a valve shell provided in the wall thereof with a longitudinal channel constituting a liquid by-pass, a head within the valve shell, said head including a member composed of soft material and having a liquid inlet, a piston valve operable within the valve chamber and traversing said channel, a throttle valve stem rigid with the piston valve, said throttle valve stem being slidable in the liquid inlet and having frictional engagement with the soft material of said member of the said head, a liquid outlet, and a valve stem movable with the piston valve and controlling said liquid outlet, said piston valve operating at one period of its movement for expelling through the channel a definite quantity of liquid present in the valve chamber between said piston valve and the head and operating at a second stage of its movement to forcibly eject through said liquid outlet the definite quantity of liquid flowing through said channel.

In testimony whereof I have hereto signed my name this 17th day of November, 1926.

WILLIAM C. MORRILL.